United States Patent
Matsuura et al.

(10) Patent No.: US 12,536,158 B2
(45) Date of Patent: Jan. 27, 2026

(54) INFORMATION PROCESSING APPARATUS, ADJACENT NODE SELECTING METHOD AND PROGRAM

(71) Applicant: NTT, Inc., Tokyo (JP)

(72) Inventors: Hiroshi Matsuura, Tokyo (JP); Yoshinori Goto, Tokyo (JP); Hidehiro Sao, Tokyo (JP)

(73) Assignee: NTT, INC., Tokyo (JP)

( * ) Notice: Subject to any disclaimer, the term of this patent is extended or adjusted under 35 U.S.C. 154(b) by 0 days.

(21) Appl. No.: 18/271,040

(22) PCT Filed: Jan. 7, 2021

(86) PCT No.: PCT/JP2021/000357
§ 371 (c)(1),
(2) Date: Jul. 5, 2023

(87) PCT Pub. No.: WO2022/149239
PCT Pub. Date: Jul. 14, 2022

(65) Prior Publication Data
US 2024/0070144 A1 Feb. 29, 2024

(51) Int. Cl.
*G06F 16/00* (2019.01)
*G06F 16/23* (2019.01)

(52) U.S. Cl.
CPC ................ *G06F 16/2379* (2019.01)

(58) Field of Classification Search
CPC .................................................. G06F 16/2379
USPC ....................................................... 707/703
See application file for complete search history.

(56) References Cited

U.S. PATENT DOCUMENTS

2019/0348426 A1* 11/2019 Cho ................. H10B 41/40
707/707
2020/0259633 A1* 8/2020 Gallagher-Lynch ........................
H04L 9/3297
707/707

OTHER PUBLICATIONS

Ke Wang and Hyong S. Kim (2019) "FastChain: Scaling blockchain system with informed neighbor selection" IEEE International Conference on Blockchain, Jul. 14, 2019.
Author Unknown (2020) "Blockchain" Wikipedia, Nov. 8, 2020 [onlline] website: https://ja.wikipedia.org/wiki/%E3%83%96%E3%83%AD%E3%83%83%E3%82%AF%E3%83%81%E3%82%A7%E3%83%BC%E3%83%B3.

* cited by examiner

*Primary Examiner* — Alexandria Y Bromell

(57) ABSTRACT

An information processing device is an information processing device as any node among a plurality of nodes constituting a blockchain network extending over a plurality of areas, and includes: an area determination unit that determines an area to which each of the plurality of nodes belongs based on information registered for each of the plurality of nodes; and a selection unit that selects Outbound adjacent nodes among the Outbound adjacent nodes of a node related to the information processing device so that a number of nodes belonging to other areas with respect to an area to which the relevant node belongs is a constant number, thereby efficiently improving fairness between nodes of the blockchain network.

4 Claims, 12 Drawing Sheets

Fig. 6

|  | NORTH AMERICA | EU | SOUTH AMERICA | ASIA PACIFIC | JAPAN | AUSTRALIA |
|---|---|---|---|---|---|---|
| NORTH AMERICA | 32 | 124 | 184 | 198 | 151 | 189 |
| EU | 124 | 11 | 227 | 237 | 252 | 294 |
| SOUTH AMERICA | 184 | 227 | 88 | 325 | 301 | 322 |
| ASIA PACIFIC | 198 | 237 | 325 | 85 | 58 | 198 |
| JAPAN | 151 | 252 | 301 | 58 | 12 | 126 |
| AUSTRALIA | 189 | 294 | 322 | 198 | 126 | 16 |

INFORMATION PROCESSING APPARATUS, ADJACENT NODE SELECTING METHOD AND PROGRAM

CROSS-REFERENCE TO RELATED APPLICATIONS

This application is a U.S. National Stage Application filed under 35 U.S.C. § 371 claiming priority to International Patent Application No. PCT/JP2021/000357, filed on 7 Jan. 2021, the disclosure of which is hereby incorporated herein by reference in its entirety.

TECHNICAL FIELD

The present invention relates to an information processing device, an adjacent node selection method, and a program.

BACKGROUND ART

A blockchain is a database that stores data by generating a unit of encrypted data called a block and concatenating the blocks like a chain (chain). Blockchain technology is widely used as a platform of virtual currency represented by bitcoin.

Each node belonging to a blockchain network serves as a miner (miner), and generates a new block satisfying the hash function condition. A node that has generated a block approved from a constant number of nodes can obtain a reward. However, in a case where a plurality of different miners generate blocks satisfying the hash function condition at substantially the same time, there is a case where a plurality of blocks are simultaneously approved and the blockchain is branched (forked). In this case, a block belonging to a branch destination chain other than the chain having the largest number of blocks needs to be discarded as an orphan block later. One of the causes of this fork is a block propagation speed. This is because if the speed at which the block reaches the entire network is sufficient, the block generated later is not approved.

Each node of the blockchain network holds eight adjacent nodes as Outbound adjacent nodes by default, and directly transmits a block generated by its own node or a block transferred from another node to the Outbound adjacent nodes. In addition, each node holds Inbound adjacent nodes separately from the Outbound adjacent nodes. The Inbound adjacent nodes of a certain node are adjacent nodes that can directly receive a block. Each node can hold Outbound and Inbound together up to 125 adjacent nodes.

Each node has two tables, and selects Outbound adjacent nodes from the two tables. The first table is a new table in which nodes having no adjacency relationship with the relevant node are listed, and information obtained from a domain name system (DNS) is initially stored in the new table. The second table is a tried table in which nodes having an adjacency relationship with the relevant node are listed.

CITATION LIST

Non Patent Literature

Non Patent Literature 1: K. Wang and H. S. Kim, "FastChain: Scaling blockchain system with informed neighbor selection", IEEE International Conference on Blockchain, 2019.

SUMMARY OF INVENTION

Technical Problem

Although eight Outbound adjacent nodes are initially set by default in each node of the blockchain network, the adjacent node may be periodically changed in accordance with addition of a new node, down of the adjacent node, or the like. The source code of the bitcoin node which is a representative blockchain network can be downloaded from the URL of "bitcoin/bitcoin: https://github.com/bitcoin/bitcoin". However, as described in Non Patent Literature 1 (page 378, the twelfth row from the top of the left column), each node randomly selects eight Outbound adjacent nodes from the new table and the tried table held by the relevant node in the default setting (conventional method 1).

In Non Patent Literature 1, in order to solve a problem that a conventional method selects a node having a small transmission band as an adjacent node, each node measures a block propagation time from the adjacent node, and in a case where the adjacent node having a slow propagation speed is included in Outbound adjacent nodes, a method of periodically (for example, every reception of five blocks) replacing the adjacent node with an adjacent node randomly selected from a new table or a tried table is adopted (conventional method 2).

The following equation (1) is an estimated band from a target node (N) calculated by each node (A).

$$BD(N) = \text{block size/one hop propagation time}(N-A) \quad (1)$$

Note that the "one hop propagation time (N–A)" indicates a one hop block propagation time from the node N to the node A.

Since the block size does not change in one blockchain network, equation (1) may be considered as a reciprocal of a one hop block propagation time of from the node N to the node A. The block propagation time from the node N can be obtained by measuring a reception time of an INVITE message (Non Patent Literature 1) from the node N to a time at which a block is received. In Non Patent Literature 1, in a case where the table update period is T blocks, the lower limit of the estimated band (equation (1)) to be deleted from the adjacent node list is B, and the upper limit of the number of Outbound adjacent nodes to be deleted by one-time update is K, it is assumed that applicability is high at T=5 and K=2.

FIG. 1 is a diagram for explaining a conventional method 2. In this example, the upper limit K of the number of adjacent nodes to be deleted is set to 2, and the lower limit value B of the allowable band is set to 1.5 MB. The node first mainly puts a list of domain names and IP addresses of adjacent node candidates acquired from the DNS in the new table, and randomly stores eight Outbound adjacent nodes from the list in the Outbound adjacent node list. Furthermore, in a case where there is a connection request from another node, the node is stored in the Inbound adjacent node list within a range in which the total number of adjacent nodes does not exceed 125. A node that has become an adjacent node once is stored in the tried table. In the latest band table specific to the conventional method 2, the block propagation band based on the latest equation (1) from each Inbound adjacent node is updated, and when two adjacent notes having the smallest estimated band (equation) at a T=5 block interval are smaller than the lower limit value B, the adjacent nodes are deleted from the Outbound adjacent node list and the Inbound adjacent node list. In FIG. 1, the adjacent nodes E, G, J, and M are the adjacent nodes of the estimated band smaller than the lower limit value B, but the adjacent nodes E and G having the smallest estimated band are deleted. The node no longer receives a block from a node deleted from the Inbound adjacent node list, and no longer transmits a block to a node deleted from the Outbound adjacent node list. In this manner, an adjacent node having a large block propagation band remains in the Outbound/Inbound adjacent node list. In a case where there are the deleted Outbound adjacent nodes, the node randomly selects the Outbound adjacent nodes from the two tables instead of the deleted adjacent nodes and maintains the number of Outbound adjacent nodes=8.

However, the conventional method 2 has the following problems.

The first problem is that there is a possibility that unfairness occurs among miners. Since a node having a low block propagation speed cannot maintain an adjacency relationship with another node, the block is hardly propagated.

The second problem is that the load on each node increases. Each node needs to constantly record the block transfer time from the adjacent node as processing other than mining and block transfer.

The third problem is that an Eclipse attack is likely to occur when such adjacent node setting other than random selection is performed. A malicious attacker can transmit a block at a high propagation speed to an attack target adjacent node, impersonate an adjacent node of the node, and create an environment in which erroneous information is easily transmitted to the target node.

The fourth problem is that, as described in Non Patent Literature 1, it is necessary to replace adjacent nodes in the adjacent node list until the speed of block propagation on the network is increased to some extent, and mining of 20-25 blocks is necessary until the propagation speed becomes optimal, which takes time.

The working example of the conventional method 1 can be implemented as excluding the latest band table in FIG. 1. The conventional method 1, at first, randomly sets eight Outbound adjacent nodes from a new table, and randomly updates a table of eight Outbound adjacent nodes from the new table or the tried table as needed when the adjacent node does not respond to communication, when a new node participates in the network, or the like. In the conventional method 1, since it is not necessary to manage the band of the adjacent node, the node load is reduced, and the Eclipse attack is less likely to occur due to the random selection, but there is a high possibility that the number of adjacent nodes in the area having a large propagation delay is made larger than the necessary number, and there is a high possibility that a block propagation delay occurs.

The present invention has been made in view of the above points, and an object thereof is to efficiently improve fairness between nodes of a blockchain network.

Solution to Problem

Therefore, in order to solve the above problem, an information processing device as any node among a plurality of nodes constituting a blockchain network extending over a plurality of areas includes: an area determination unit that determines an area to which each of the plurality of nodes belongs based on information registered for each of the plurality of nodes; and a selection unit that selects Outbound adjacent nodes among the Outbound adjacent nodes of a node related to the information processing device so that a number of nodes belonging to other areas with respect to an area to which the relevant node belongs is a constant number.

Advantageous Effects of Invention

Fairness between nodes in a blockchain network can be efficiently improved.

BRIEF DESCRIPTION OF DRAWINGS

FIG. 6 is a diagram illustrating a matrix of propagation delays (milliseconds) in 1-bit transfer into and out of an area in SimBlock setting.

DESCRIPTION OF EMBODIMENTS

Hereinafter, a first embodiment will be described with reference to the drawings. In the present embodiment, one computer (hereinafter, referred to as an "information processing device 10") that functions as a node of a blockchain network will be described, but each node constituting a blockchain node has a similar configuration.

Figure 1:
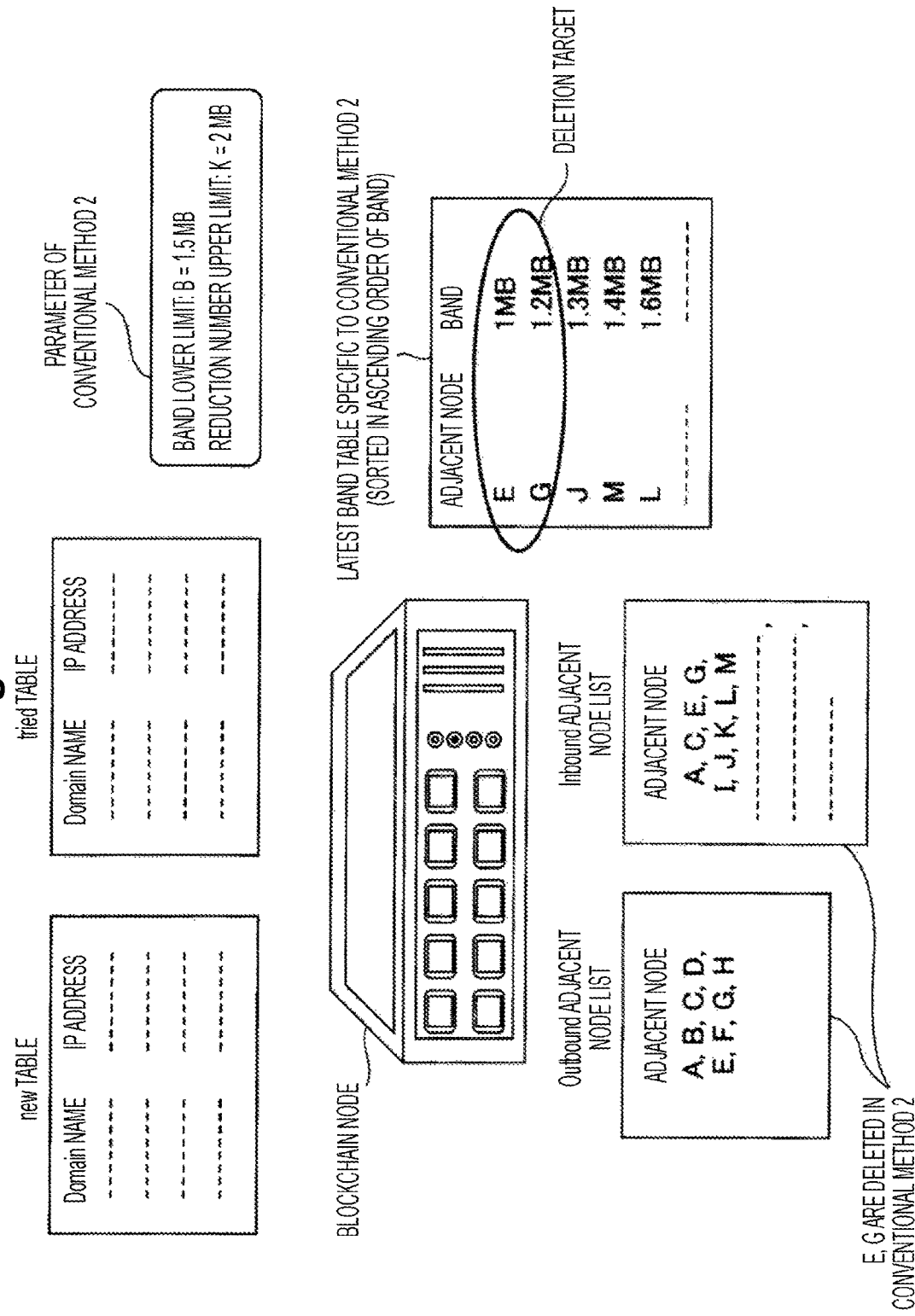
FIG. 1 is a diagram for explaining a conventional method 2.
Figure 2:
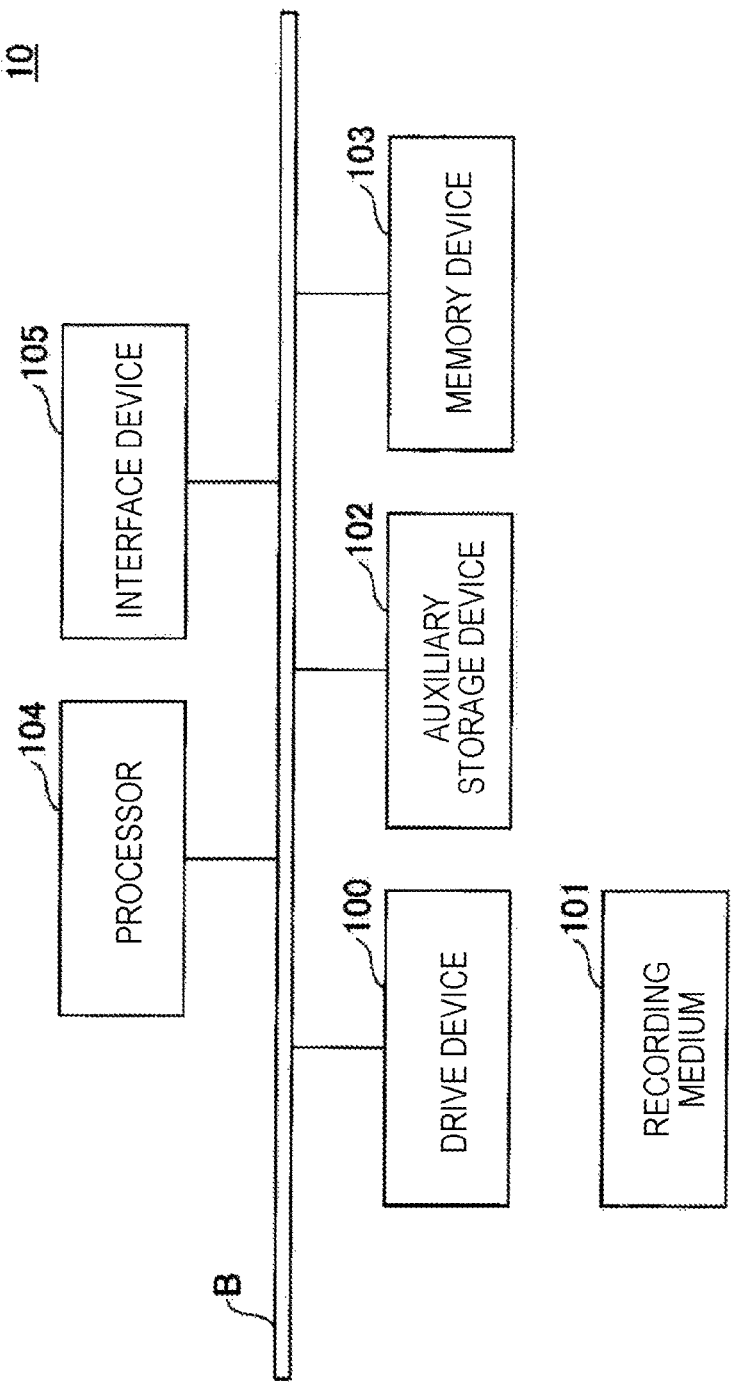
FIG. 2 is a diagram illustrating a hardware configuration example of an information processing device 10 according to a first embodiment.

FIG. 2 is a diagram illustrating a hardware configuration example of the information processing device 10 in the first embodiment. The information processing device 10 in FIG. 2 includes a drive device 100, an auxiliary storage device 102, a memory device 103, a processor 104, an interface device 105, and the like which are connected to each other by a bus B.

A program for realizing processing in the information processing device 10 is provided by a recording medium 101 such as a CD-ROM. When the recording medium 101 storing the program is set in the drive device 100, the program is installed from the recording medium 101 to the auxiliary storage device 102 via the drive device 100. However, the program is not necessarily installed from the recording medium 101, and may be downloaded from another computer via a network. The auxiliary storage device 102 stores the installed program and also stores necessary files, data, and the like.

When an instruction to start the program is issued, the memory device 103 reads the program from the auxiliary storage device 102 and stores the program. The processor 104 is a CPU or a graphics processing unit (GPU), or a CPU and a GPU, and executes a function related to the information processing device 10 according to the program stored in the memory device 103. The interface device 105 is used as an interface for connecting to a network.

Figure 3:
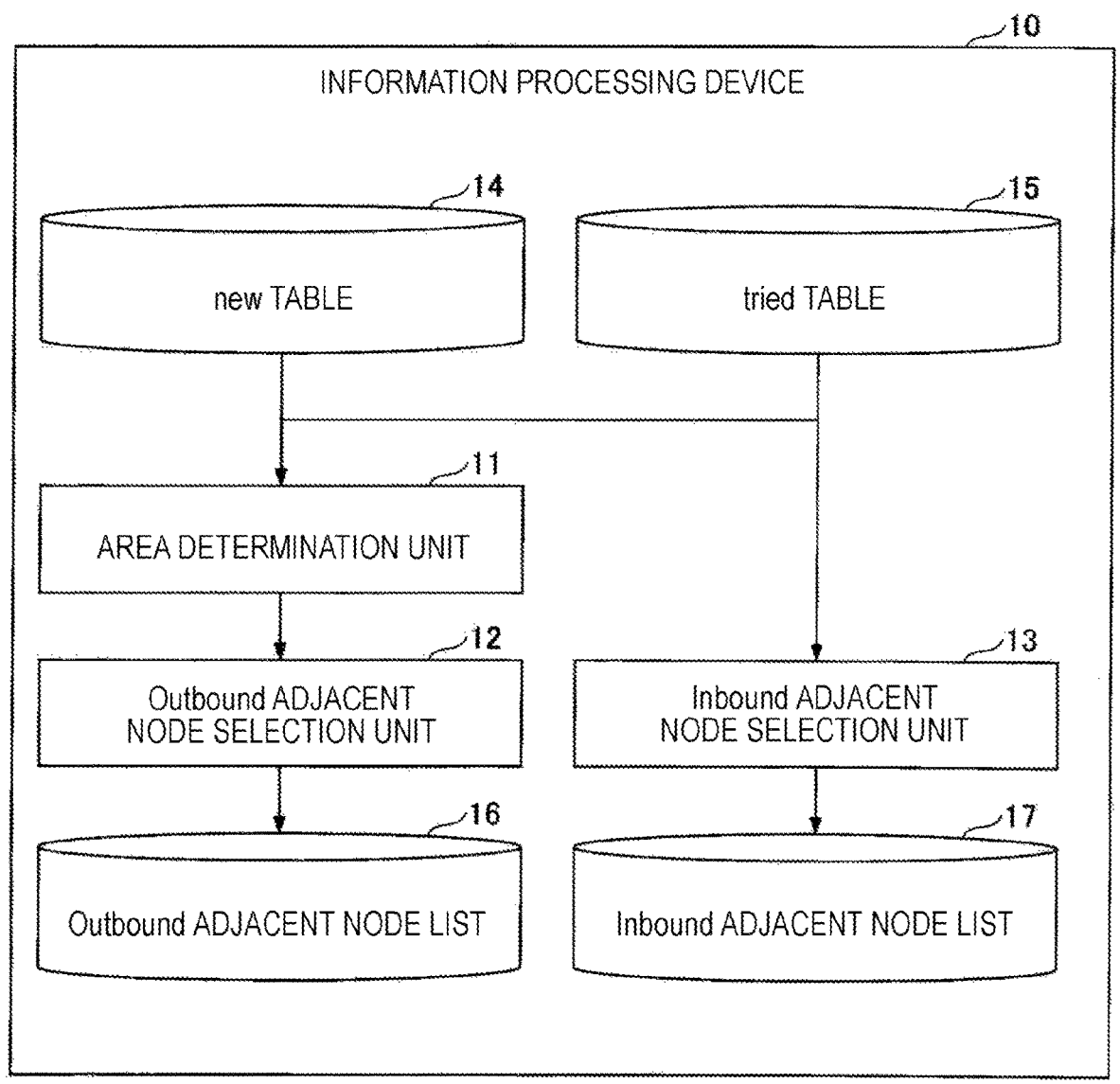
FIG. 3 is a diagram illustrating a functional configuration example of the information processing device 10 according to the first embodiment.

FIG. 3 is a diagram illustrating a functional configuration example of the information processing device 10 according to the first embodiment. In FIG. 3, the information processing device 10 includes an area determination unit 11, an Outbound adjacent node selection unit 12, and an Inbound adjacent node selection unit 13. These units are realized by processing which one or more programs installed in the information processing device 10 cause the processor 104 to execute. The information processing device 10 also uses storage units such as a new table 14, a tried table 15, an Outbound adjacent node list 16, and an Inbound adjacent node list 17. Each of these storage units can be realized by using, for example, the memory device 103, the auxiliary storage device 102, a storage device connectable to the information processing device 10 via a network, or the like.

In the new table 14, a list of information including a domain name, an IP address, and the like of a node having no adjacency relationship held by the information processing device 10 is registered. Initially, information obtained from a domain name system (DNS) is registered in the new table 14. In the tried table 15, a list of information including a domain name, an IP address, and the like of a node having an adjacency relationship with the information processing device 10 is registered. Note that the adjacency relationship refers to a relationship in which direct exchange (transmission and reception) of blocks is permitted.

The area determination unit 11 determines whether each adjacent node candidate is a node in its own area or a node in another area on the basis of information (a domain name or an IP address) of each adjacent node candidate whose domain name and the like are registered in the new table 14 or the tried table 15. Here, the node in the own area refers to a node arranged in the same area as the area to which the node related to the information processing device 10 belongs. The node in the other area refers to a node arranged in an area different from the area to which the node related to the information processing device 10 belongs. Furthermore, the area is a partial range obtained by dividing a geographical range over which the blockchain network extends into a plurality of parts. For example, in the case of a blockchain network extending over the world, one country or a set of a plurality of countries corresponds to the area. However, the area may be divided in any unit as long as the unit is distinguishable on the basis of the information registered in the new table 14.

For example, the IP address is managed by a global organization called Internet Corporation Assigned Names and Numbers (ICANN) ("ICANN's role: https://www.icann.org/resources/pages/what-2012-02-25-ja"). The area determination unit 11 may determine whether the node of the IP address registered in the DNS is the own area or another area by using the public information.

The Outbound adjacent node selection unit 12 selects Outbound adjacent nodes from among the adjacent node candidates registered in the new table 14 or the tried table 15. When selecting an Outbound adjacent node, the Outbound adjacent node selection unit 12 randomly selects α from among the total number of Outbound adjacent nodes (for example, eight) from among nodes in other areas, and randomly selects the rest from among nodes in the own area. Note that α may be a common value (that is, a constant (common) value for all the nodes) over the all areas, or may be a different value for each area, and is determined in advance or calculated on the basis of a predetermined calculation formula. The Outbound adjacent node selection unit 12 records the selection result in the Outbound adjacent node list 16. Therefore, in the Outbound adjacent node list 16, the number of nodes in other areas is maintained at a. As a result, while maintaining random selection of adjacent nodes, the number of Outbound adjacent nodes belonging to other areas having a generally large propagation delay between adjacent nodes is made constant, so that it is possible to reduce unfairness between miners (improve fairness).

The Inbound adjacent node selection unit 13 basically sets another node in the Inbound adjacent node list 17 on the basis of Outbound adjacent node setting notification from the other node. However, the method of selecting Inbound adjacent nodes by the Inbound adjacent node selection unit 13 may be any other method.

As described above, according to the first embodiment, since the Outbound adjacent node candidates belonging to the other areas can be determined from the IP address/domain name of the node of the DNS, it is not necessary to record all the propagation times of the blocks transmitted from each node to its own node as in the conventional method 2. Therefore, the load on each node can be reduced.

In addition, since the adjacent nodes are randomly selected from both the own area and the other areas, the possibility of receiving the Eclipse attack can be reduced, and the occurrence of a problem that a node in an area having a small transmission band cannot receive a block can be reduced.

In addition, since the number of Outbound adjacent nodes is constant or substantially equal between nodes from the beginning, a difference in propagation time when blocks are transmitted and received between nodes is less likely to occur, and it is possible to improve fairness between miners.

Therefore, fairness between nodes in the blockchain network can be efficiently improved.

Next, a second embodiment will be described. In the second embodiment, points different from the first embodiment will be described. The points not specifically mentioned in the second embodiment may be the same as those in the first embodiment.

In the second embodiment, an example in which α is more limited than in the first embodiment will be described. In the second embodiment, α is set to a small value (one, two, etc., for eight Outbound adjacent nodes) as compared with a case where Outbound adjacent nodes are randomly selected regardless of the belonging areas, and is a constant (common) value (constant number) for all the nodes.

Figure 4:
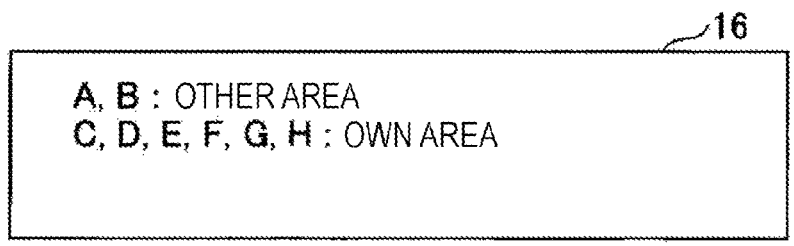
FIG. 4 is a diagram illustrating an example of an Outbound adjacent node list 16 for describing a second embodiment.

FIG. 4 is a diagram illustrating an example of an Outbound adjacent node list 16 for describing the second embodiment. In the Outbound adjacent node list 16 of FIG. 3, symbols A to H indicate identifiers of nodes. Among them, A and B are nodes in other areas, and C, D, E, F, G, and H are nodes in the own area. That is, FIG. 4 illustrates an example in which α=2.

For example, a may be set to a value smaller than an average value of the numbers of Outbound adjacent nodes belonging to other areas selected in a case where the Outbound adjacent nodes are randomly selected regardless of the belonging areas. Here, the average value of the numbers of Outbound adjacent nodes belonging to other areas selected in a case where the Outbound adjacent nodes are randomly selected can be analogized from the total number of areas. For example, in a case where the total number of areas is six, it is analogized that Outbound adjacent nodes belonging to other areas are selected at an average rate of 5/6 (=6−1). Therefore, in this case, a value of six or less, which is a positive number less than 8×5/6=40/6, is enough to be set as α.

As described above, according to the second embodiment, the block propagation delay can be suppressed to be small since the block propagation delay is set to a smaller value than in a case where the Outbound adjacent nodes are randomly selected regardless of the belonging areas.

Next, a third embodiment will be described. In the third embodiment, points different from the first embodiment will be described. The points not specifically mentioned in the third embodiment may be the same as those in the first embodiment.

In the third embodiment, similarly to the second embodiment, the number of Outbound adjacent nodes belonging to the other areas of each node is set to be smaller than the average value in a case where the Outbound adjacent nodes are randomly selected, but in a case where the number of nodes in the own area is small, the number of Outbound adjacent nodes belonging to the other areas is increased in inverse proportion to the number of nodes in the own area. Therefore, in the third embodiment, the value of a may be different for each area.

For example, in a case where the number of Outbound adjacent nodes (that is, α) belonging to other areas is defined as X, the number of all Outbound adjacent nodes is defined as Y, the positive number parameter value is defined as Z, and the own area node rate is defined as a ratio of the number of nodes belonging to the own area to the number of nodes in the all areas (that is, the total number of nodes in the blockchain network), $$X = Y - \text{ceil}(Y \times \text{own area node rate}) - Z \qquad (2).$$

Note that ceil (A) represents a minimum integer of A or more. The value of X may be calculated by the Outbound adjacent node selection unit 12 or may be set in advance. In addition, in a case where X is equal to or less than 0, the number of Outbound adjacent nodes (that is, the value of X) belonging to other areas may be set to 1 (hereinafter, the processing of setting the value of X to 1 is referred to as "correction processing").

For example, the percentage of nodes participating in the bitcoin network in 2019 is North America (33.16%), the EU (49.98%), South America (0.9%), Asia Pacific (11.77%), Japan (2.24%), and Australia (1.95%), and for nodes in each area, the number of Outbound adjacent nodes (that is, α) belonging to other areas is defined as X (North America), X (EU), X (South America), X (Asia Pacific), X (Japan), and X (Australia). In addition, in Formula (2), the number of Outbound adjacent nodes Y=8 and the positive number constant Z=4.

In this case, $$X \text{ (North America)} = 8 - \text{ceil}(8 \times 0.3316) - 4 = 1$$

$$X \text{ (EU)} = 8 - \text{ceil}(8 \times 0.4998) - 4 = 0 (X(EU) = 1$$

when the correction processing is enabled)

$$X \text{ (South America)} = 8 - \text{ceil}(8 \times 0.009) - 4 = 3$$

$$X \text{ (Asia Pacific)} = 8 - \text{ceil}(8 \times 0.1177) - 4 = 3$$

$$X \text{ (Japan)} = 8 - \text{ceil}(8 \times 0.0224) - 4 = 3, \text{ and}$$

$$X \text{ (Australia)} = 8 - \text{ceil}(8 \times 0.0195) - 4 = 3, \text{ and}$$

the number of Outbound adjacent nodes belonging to other areas is 1 in North America and EU, but is 3 in other areas.

Note that, when Z=5, the number of Outbound adjacent nodes is 1 in North America and EU, and 2 in other areas. Note that the positive number parameter Z is used to suppress the value of X to be small.

As described above, according to the third embodiment, since it is possible to increase the number of adjacent nodes belonging to other areas in an area where the number of adjacent nodes in the own area is small, it is possible to reduce unfairness caused among miners depending on the area.

In addition, in a case where the value of X is 0 or less, by setting X=1, each node can hold at least one Outbound adjacent node belonging to the other area.

Note that the third embodiment is particularly effective in a case where there is an area in which the number of nodes participating in the blockchain network is small. In such an area, it is also assumed that the total number of Outbound adjacent node candidates in the area is 5 or less. In this case, the number of Outbound adjacent nodes in other areas can be increased. As a result, each node can always secure eight Outbound adjacent nodes, and it is possible to reduce unfairness of miners depending on areas.

Comparative Evaluation Between Conventional Method and Present Embodiment (Each of the Above Embodiments)

Quantitative comparative evaluation between the conventional method 1 and the present embodiment will be described below. As a simulator, SimBlock of "Tokyo Institute of Technology News: Development and distribution of simulator "SimBlock" of public blockchain started: https://www.titech.ac.jp/news/2019/044557.html" was used.

Figure 5:
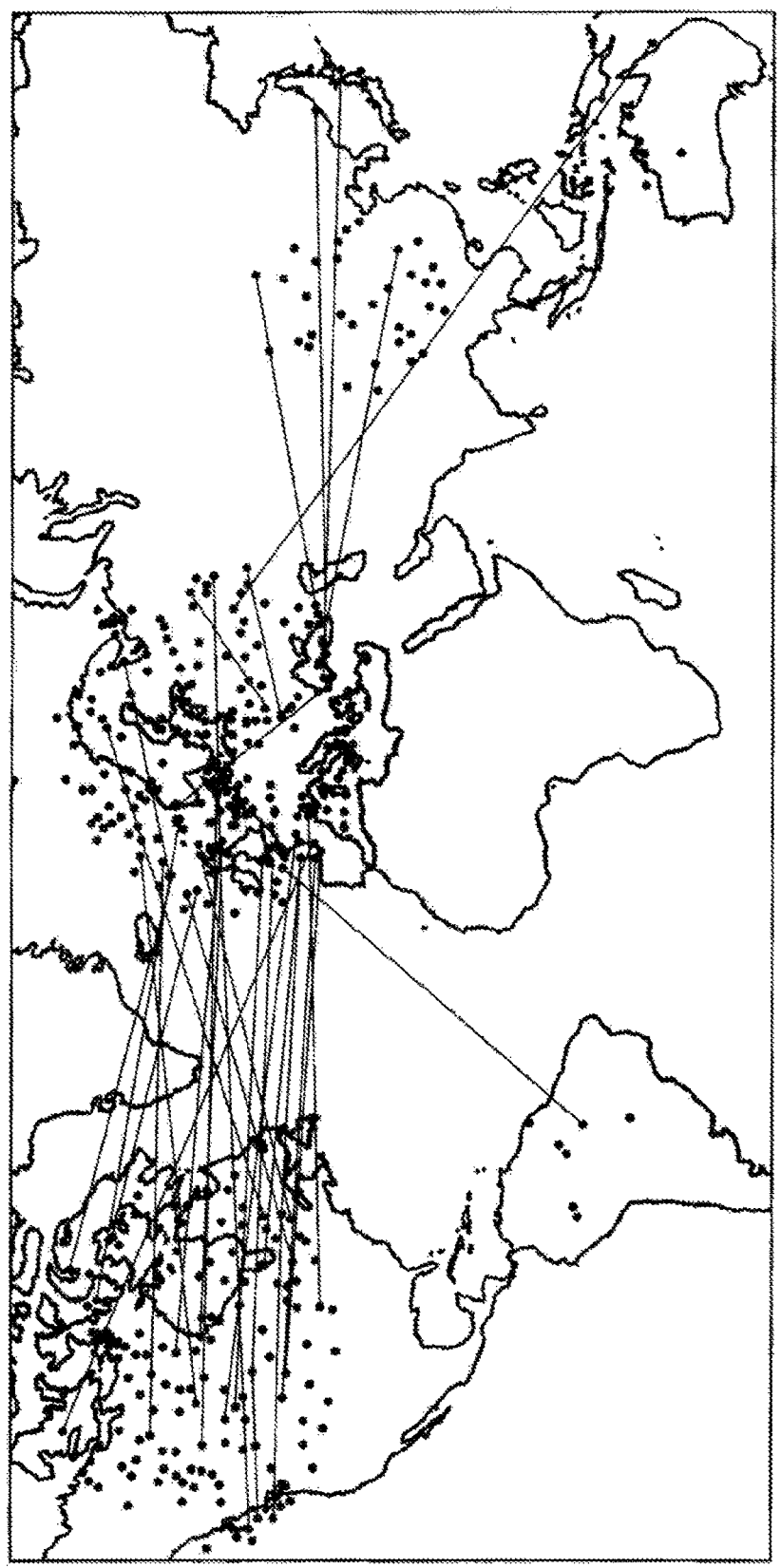
FIG. 5 is a diagram illustrating a blockchain node arrangement in SimBlock and a setting example of an adjacency relationship between nodes.

FIG. 5 is a diagram illustrating a blockchain node arrangement in SimBlock and a setting example of an adjacency relationship between nodes. FIG. 5 is based on a SimBlock simulator explanation slide: http://www.shudo.net/publications/20190729-IEEE-Tokyo-blockchain/shudo-IEEE-Tokyo-blockchain.pdf. In SimBlock, as illustrated in FIG. 5, it is possible to randomly arrange nodes in each area of the world and set an adjacency relationship between the nodes. In the evaluation environment used in this comparative evaluation, the node arrangement ratio of the bitcoin in 2019 was used to randomly arrange the nodes in each area in the world with the arrangement possibility of North America (33.16%), EU (49.98%), South America (0.9%), Asia Pacific (11.77%), Japan (2.24%), and Australia (1.95%). Note that FIG. 6 illustrates a matrix of propagation delays (milliseconds) in 1-bit transfer to the inside and outside of the area in the SimBlock setting. This matrix is also based on the statistics of the bitcoin network of 2019.

Figure 7:
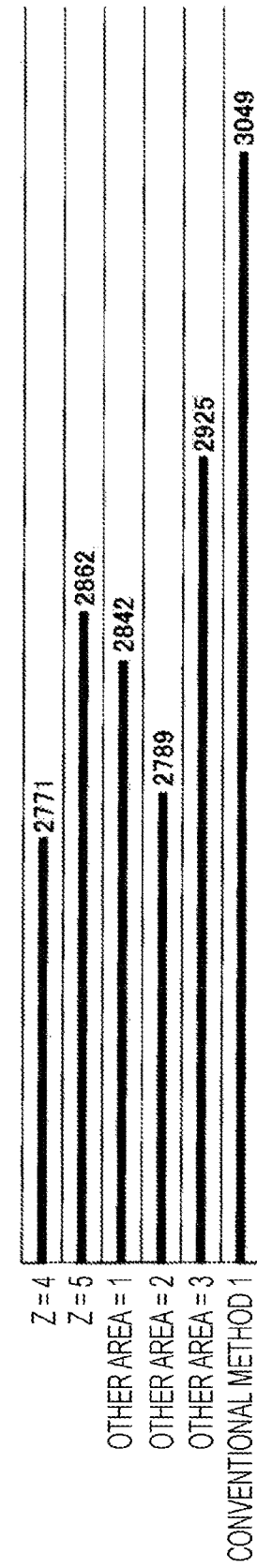
FIG. 7 is a diagram illustrating superiority of the present embodiment over a conventional method 1 in block propagation time.
Figure 8:
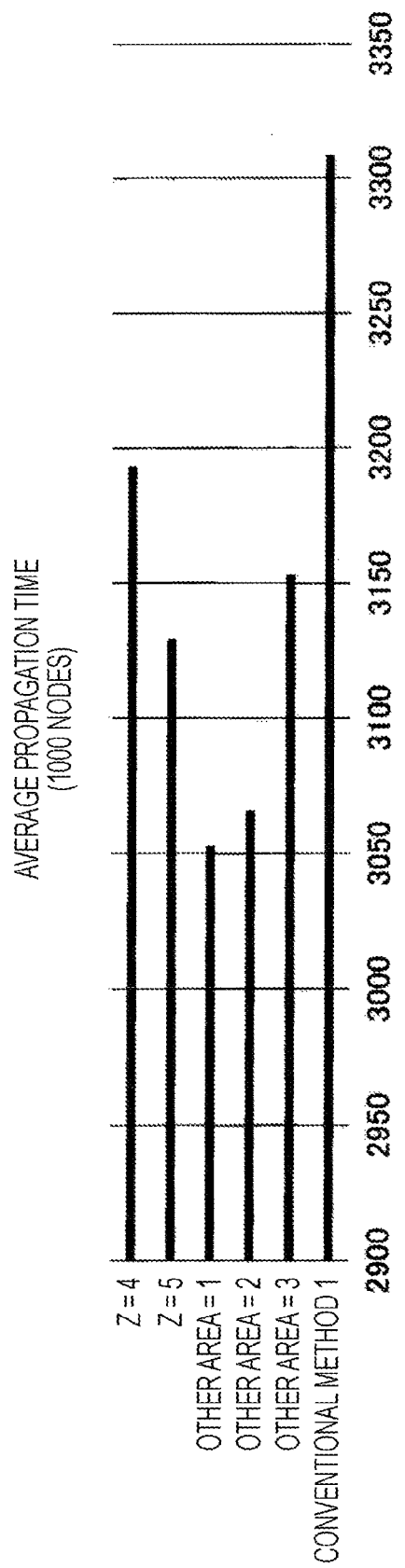
FIG. 8 is a diagram illustrating superiority of the present embodiment over the conventional method 1 in block propagation time.

FIGS. 7 and 8 are diagrams illustrating superiority of the present embodiment over the conventional method 1 in block propagation time. FIG. 7 corresponds to a case where the number of nodes randomly arranged in the whole world is 500, and FIG. 8 corresponds to a case where the number of nodes randomly arranged in the whole world is 1000.

In each figure, the "conventional method 1" is a method of randomly selecting eight Outbound adjacent nodes. On the other hand, "other areas=a" is a scheme in which the number of Outbound adjacent nodes (that is, α) in the other areas is fixed to a in the present embodiment. In addition, "Z=b" is a method of determining the number of Outbound adjacent nodes in the other areas on the basis of Formula (2), and the value of the constant value Z in that case is b. The average propagation time indicates an average time until each of 500 or 1000 existing nodes receives each block generated by the miner. Note that, since the block height of the main chain is set to 200, it indicates the average block propagation time until 201 blocks of the main chain spread throughout the network.

Note that Proof of Work (PoW) is used as a consensus algorithm of the blockchain ("BLOCKCHAIN business community: Technology "Proof of Work (PoW)" supporting blockchain is: https://www.businessblockchain.org/what-is-proof-of-work-for-blockchain/").

As illustrated in FIGS. 7 and 8, it can be seen that the block propagation time of the present embodiment is shorter than that of the conventional method 1 in any network. In particular, in a case where the number of Outbound adjacent nodes in other areas is fixed to one or two in the present embodiment, the propagation time is shorter than that in the case where the number of Outbound adjacent nodes is fixed to three. This is because, since the Outbound adjacent nodes are randomly selected in the conventional method 1, the selection probability of the out-of-area adjacent nodes becomes 50% or more, the number of the out-of-area adjacent nodes becomes larger than necessary, and the block propagation time increases as is clear from the matrix of FIG. 6. Also in a case where the out-of-area adjacent node is fixed to three, it is considered that the propagation delay increases for this reason.

Figure 9:
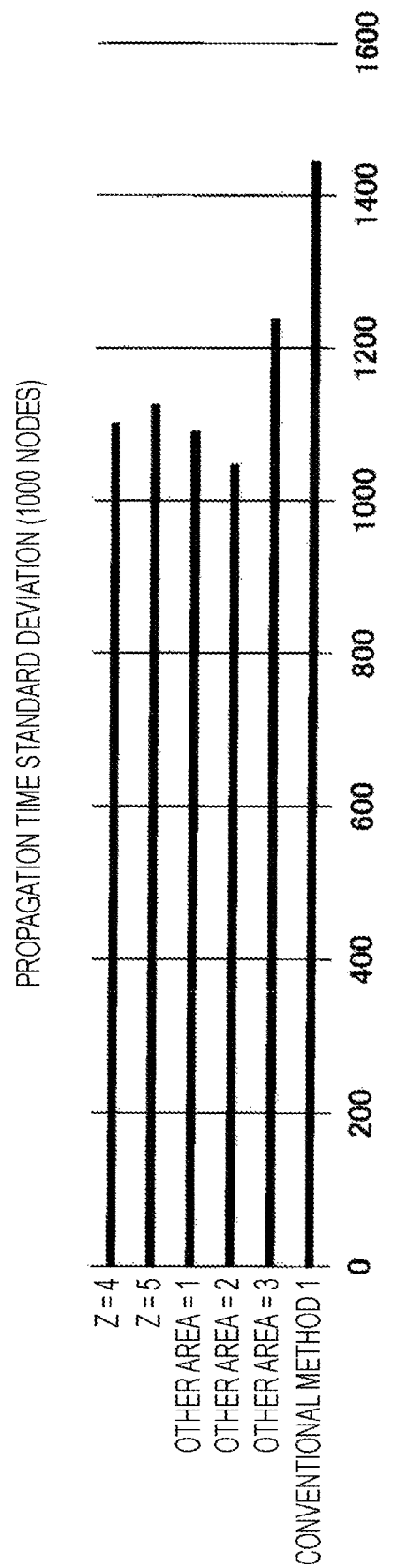
FIG. 9 is a diagram illustrating a standard deviation of a block propagation time until each block of a main chain of 201 reaches each node on a network.
Figure 10:
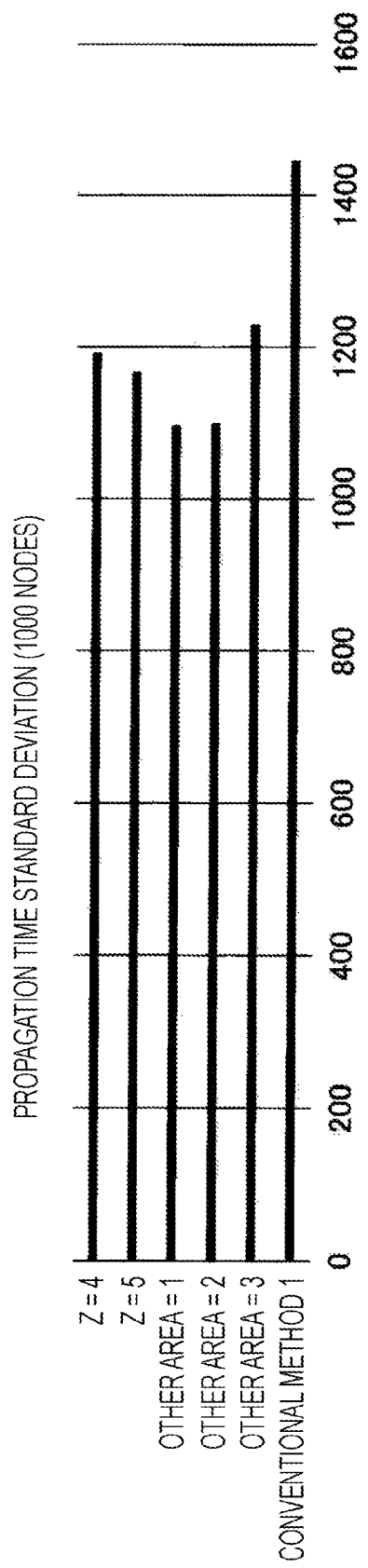
FIG. 10 is a diagram illustrating a standard deviation of a block propagation time until each block of the main chain of 201 reaches each node on the network.

FIGS. 9 and 10 are diagrams illustrating standard deviations of block propagation time until each of the 201 blocks of the main chain reaches each node on the network. FIG. 9 corresponds to a case where the number of nodes randomly arranged in the whole world is 500, and FIG. 10 corresponds to a case where the number of nodes randomly arranged in the whole world is 1000.

The fact that the standard deviation is large indicates that there is a large difference in time until the block reaches each node, and there is a large unfairness among miners. It can be seen that the conventional method 1 has a clearly larger standard deviation than each proposed method. The reason is that the number of Outbound adjacent nodes in other areas of each node is equal or substantially equal in the present embodiment, and thus the block propagation condition of the node is more fair than the conventional method 1 in which the Outbound adjacent nodes are randomly selected.

Figure 11:
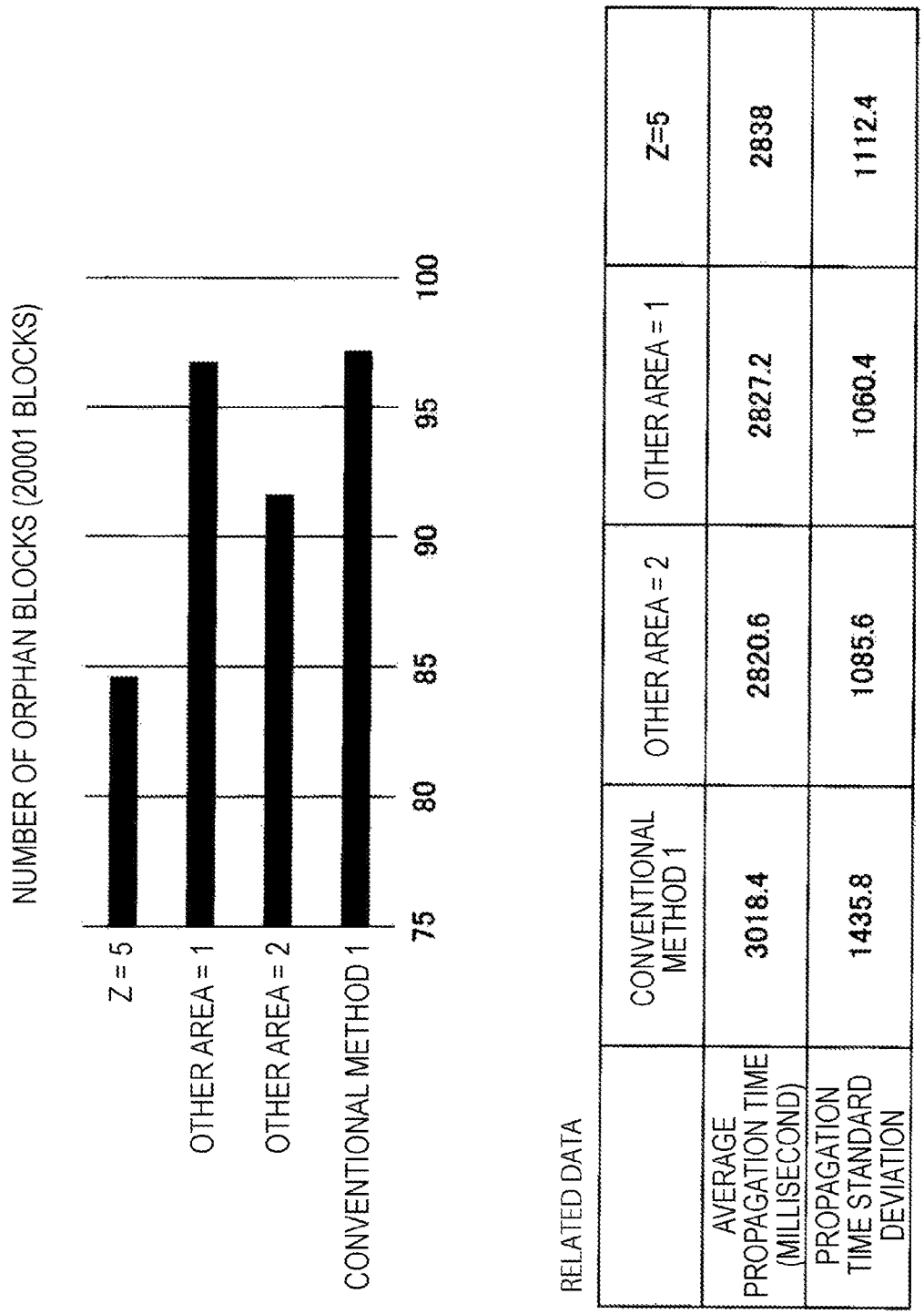
FIG. 11 is a diagram illustrating evaluation results of the present embodiment with respect to the conventional method 1 regarding the effect of decreasing an orphan block rate.
Figure 12:
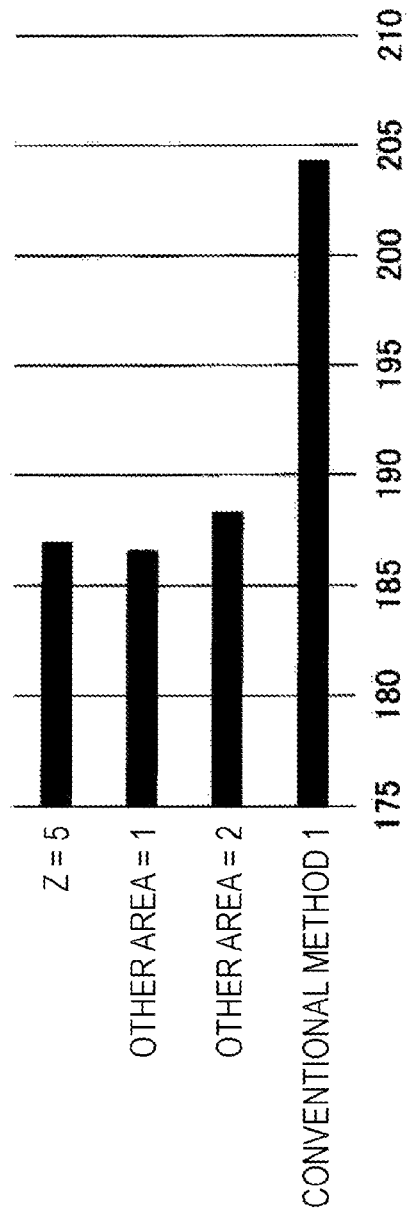
FIG. 12 is a diagram illustrating evaluation results of the present embodiment with respect to the conventional method 1 regarding the effect of decreasing the orphan block rate.

FIGS. 11 and 12 are diagrams illustrating evaluation results of the present embodiment with respect to the conventional method 1 regarding the effect of decreasing the orphan block rate.

In a blockchain, in a case where different blocks are generated by different miners at approximately the same time, either block may have a defined number of approvals and may be generated by forking under the same parent block ("Wikipedia: Blockchain: https://ja.wikipedia.org/wiki/%E3%83%96%E3%83%AD%E3%83%83%E3%82%AF%E3%83%81%E3%82%A7%E3%83%BC%E3%83%B3" (hereinafter, referred to as "reference")). In this case, a block that cannot be a main chain after being forked is discarded as an orphan block (reference document), and a transaction performed on the orphan block is also discarded, so that the orphan block should not be generated as much as possible. One factor for generating an orphan block is a block propagation delay. This is because, if a block is spread throughout the network at a high speed, in a case where another block generation notification arrives at a certain node, the block has already arrived at the node, and therefore a block arriving later is not approved.

In FIGS. 11 and 12, as the present embodiment, three of "other area=1", "other area=2", and "Z=5" are compared with the conventional method 1. This is because excellent results were obtained in both the block average propagation time and the standard deviation in these three methods. The total number of nodes was set to 500, the number of blocks of the main chain was set to 20001 blocks in FIG. 11 and 40001 blocks in FIG. 12, and many blocks run until being generated. This is because an orphan block is accidentally generated, and therefore there is no clear difference in the number of blocks of about 200 blocks. In addition, for the sake of fairness, blocks were made to run five times for each of evaluations of 20001 and 40001 blocks, and the average value of the number of the orphan blocks was measured. As shown in each figure, it can be seen that the present embodiment can significantly reduce the number of orphan blocks of the conventional method 1. Specifically, "other area=1"=6%, "other area=2")=8.2%, and "Z=5"=10%, and the number of orphan blocks can be reduced by 8% or more on average. The reason for this is a decrease in the average block propagation time of the present embodiment as shown in the related data in each figure.

Note that, in the present embodiment, the Outbound adjacent node selection unit 12 is an example of a selection unit.

Although the embodiments of the present invention have been described in detail above, the present invention is not limited to such specific embodiments, and various modifications and changes can be made within the scope of the gist of the present invention described in the claims.

REFERENCE SIGNS LIST 10 information processing device
11 area determination unit
12 Outbound adjacent node selection unit
13 Inbound adjacent node selection unit
14 new table
15 tried table
16 Outbound adjacent node list
17 Inbound adjacent node list
100 drive device
101 recording medium
102 auxiliary storage device
103 memory device
104 processor
105 interface device
B bus

The invention claimed is:

1. An information processing device comprising a processor configured to execute operations comprising:
   determining an area to which a node of a plurality of nodes belongs based on information registered for the node of the plurality of nodes; and
   selecting Outbound adjacent nodes among the Outbound adjacent nodes of the node associated with the information processing device, wherein a number of nodes belonging to other areas with respect to the area to which the associated node belongs is a value inversely proportional to the number of nodes in the area to which the node related to the information processing device belongs, wherein a number of the Outbound adjacent nodes is X, a total number of Outbound adjacent nodes is Y, a positive number parameter value is Z, an own area node rate a ratio of the number of nodes in the area to which the node related to the information processing device belongs to the number of nodes in all areas, and $X = Y - \mathrm{ceil}(Y \times \text{own area node rate}) - Z.$ 2. The information processing device according to claim 1, wherein
when a value of X is 0 or less, the value of X is 1.

3. The information processing device according to claim 1, wherein
a constant number indicates a value smaller than an average value of numbers of selected nodes belonging to the other areas in a case where the Outbound adjacent nodes are randomly selected.

4. The information processing device according to claim 1, wherein the determining the area further comprises determining whether an IP address associated with the node as registered in a domain name system (DNS) is associated with the area.

* * * * *